US011183106B2

(12) United States Patent
Park et al.

(10) Patent No.: US 11,183,106 B2
(45) Date of Patent: Nov. 23, 2021

(54) DISPLAY DEVICE

(71) Applicant: Samsung Display Co., Ltd., Yongin-si (KR)

(72) Inventors: Se Hyuk Park, Yongin-si (KR); Hyo Jin Lee, Yongin-si (KR); Sang An Kwon, Yongin-si (KR); Jin Young Roh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/793,880

(22) Filed: Feb. 18, 2020

(65) Prior Publication Data

US 2020/0372853 A1 Nov. 26, 2020

(30) Foreign Application Priority Data

May 21, 2019 (KR) ........................ 10-2019-0059730

(51) Int. Cl.
*G09G 3/30* (2006.01)
*G06F 3/038* (2013.01)
*G09G 5/00* (2006.01)
*G09G 3/32* (2016.01)

(52) U.S. Cl.
CPC ....... *G09G 3/32* (2013.01); *G09G 2320/0247* (2013.01); *G09G 2330/021* (2013.01)

(58) Field of Classification Search
CPC .............................................. G09G 2300/0426
See application file for complete search history.

(56) References Cited

U.S. PATENT DOCUMENTS 7,742,066 B2 6/2010 Choi
10,186,199 B2 1/2019 Jeon
2005/0110723 A1* 5/2005 Shin .................... G09G 3/3233 345/76
2010/0033409 A1* 2/2010 Park .................... G09G 3/3233 345/76
2014/0035890 A1* 2/2014 Jinta ........................ G09G 3/20 345/204
2015/0287393 A1 10/2015 Han

FOREIGN PATENT DOCUMENTS

KR 10-0805542 B1 2/2008
KR 10-2015-0116520 A 10/2015
KR 10-2017-0086761 A 7/2017

* cited by examiner

*Primary Examiner* — Nan-Ying Yang
(74) *Attorney, Agent, or Firm* — Lewis Roca Rothgerber Christie LLP

(57) ABSTRACT

A display device includes a display unit. The display unit includes a first display area and a second display area. A first scan line, a first power line, and first pixels connected to the first scan line and the first power line are in the first display area. A second scan line, a second power line, and second pixels connected to the second scan line and the second power line are in the second display area. A scan driver is configured to sequentially provide a scan signal to the first scan line and the second scan line. A power supply is configured to provide a power source voltage that is varied independently to the first power line and the second power line.

20 Claims, 13 Drawing Sheets

DISPLAY DEVICE

CROSS-REFERENCE TO RELATED APPLICATION

This application claims priority to and the benefit of Korean Patent Application No. 10-2019-0059730 filed in the Korean Intellectual Property Office on May 21, 2019, the entire contents of which are incorporated herein by reference.

BACKGROUND

1. Field

The present invention relates to a display device.

2. Description of the Related Art

The display device includes a display panel and a driver. The display panel includes scan lines, data lines, and pixels. The driver includes a scan driver that provides scan signals to the scan lines sequentially, and a data driver that provides data signals to the data lines. Each of the pixels may emit light with a brightness corresponding to a data signal provided through the corresponding data line in response to a scan signal provided through the corresponding scan line.

The display device can display only some frame images or display a frame image with a low refresh rate (or low frequency) to reduce power consumption.

SUMMARY

When the display device displays frame images with the low refresh rate or drives with a low frequency, a time for displaying one frame image may be relatively long, and a decrease in brightness of the frame image with time and a flicker phenomenon caused by the repeated decrease in brightness may be seen by a user.

An exemplary embodiment of the present invention provides a display device capable of eliminating a flicker phenomenon.

A display device according to an exemplary embodiment of the present invention includes a display unit that includes a first display area where a first scan line, a first power line, and first pixels connected to the first scan line and the first power line are located, and a second display area where a second scan line, a second power line, second pixels connected to the second scan line and the second power line are located; a scan driver provides a scan signal to the first scan line and the second scan line; and a power supply that provides a power source voltage that is varied independently to the first power line and the second power line.

According to an exemplary embodiment of the present invention, the power supply is configured to vary the power source voltage between a first voltage level and a second voltage level, the second voltage level may be higher than the first voltage level, a voltage level of the power source voltage provided to the first power line at a first time point may change from the second voltage level to the first voltage level, and a voltage level of the power source voltage provided to the second power line at the second time point different from the first time point may change from the second voltage level to the first voltage level.

According to an exemplary embodiment of the present invention, the scan signal of a gate-on voltage level may be provided to the first scan line at a third time point, the scan signal of a gate-on voltage level may be provided to the second scan line at a fourth time point different from the third time point, an interval between the first time point and the third time point may be equal to an interval between the second time point and the fourth time point, and the gate-on voltage level may be a voltage level to turn on transistors included in each of the first and second pixels.

According to an exemplary embodiment of the present invention, the first time point may be equal to the third time point, and the second time point may be equal to the fourth time point.

According to an exemplary embodiment of the present invention, k scan lines may be arranged sequentially, and the first scan line may be a first arranged scan line of the k scan lines or adjacent to the first arranged scan line of the k scan lines.

According to an exemplary embodiment of the present invention, k scan lines may be arranged sequentially, and the first scan line may be a k-th arranged scan line of the k scan lines or adjacent to the k-th arranged scan line of the k scan lines.

According to an exemplary embodiment of the present invention, k scan lines may be arranged sequentially, and the first scan line may be adjacent to a k/2-th arranged scan line of the k scan lines.

According to an exemplary embodiment of the present invention, the first time point may be equal to the fourth time point.

According to an exemplary embodiment of the present invention, the power supply may operate in a first mode or in a second mode, may vary the power source voltage in the second mode, and may maintain the power source voltage constant in the first mode.

According to an exemplary embodiment of the present invention, a driving frequency of the scan driver while the power supply is driven in the first mode may be greater than a driving frequency of the scan driver while the power supply is driven in the second mode.

According to an exemplary embodiment of the present invention, a change amount or a change rate of the driving current flowing in each of the first pixels during one frame period may be maintained constant in a first period corresponding to the first mode and in a second period corresponding to the second mode.

According to an exemplary embodiment of the present invention, the power supply may include a first power generator to generate a first power source voltage having a first voltage level; a second power generator to generate a second power source voltage having a second voltage level; and a first switching unit to connect the first power line to one of the first power generator and the second power generator.

According to an exemplary embodiment of the present invention, the power supply may further include a third power generator to generate a third power source voltage having a third voltage level, and the first switching unit may to connect the first power line to one of the first power generator, the second power generator, and the third power generator.

According to an exemplary embodiment of the present invention, when a target brightness of the first pixels is greater than a reference brightness, the first switching unit may alternately connect the first power generator and the second power generator to the first power line, and when the target brightness of the first pixels is less than or equal to the reference brightness, the first switching unit may alternately connect the first power generator and the third power generator to the first power line.

According to an exemplary embodiment of the present invention, the display unit may include ten or more display areas, and at least some of the display areas may have the same size as each other.

According to an exemplary embodiment of the present invention, the display areas may correspond to pixel rows respectively.

According to an exemplary embodiment of the present invention, each of the first and second pixels may include a light emitting element connected to the first power line and the third power line, and an anode of the light emitting element may be connected to the first power line and a cathode of the light emitting element may be connected to the third power line.

According to an exemplary embodiment of the present invention, each of the first pixels may include a light emitting element connected to the first power line and the third power line, and an anode of the light emitting element may be connected to the third power line and a cathode of the light emitting element may be connected to the first power line.

According to an exemplary embodiment of the present invention, the first pixels and the second pixels may sequentially emit light in response to the scan signals.

According to an exemplary embodiment of the present invention, the display device may further include a data driver configured to provide a data signal to a data line, wherein the data line may be included in the display unit, and extend across the first display area and the second display area, and at least one of the first pixels and at least one of the second pixels may be connected to the data line.

A display device according to an exemplary embodiment of the present invention can reduce a change width (or change rate) of a drive current of pixels included in display areas and mitigate or prevent a brightness change and a decrease in a display quality due to the brightness change from being seen by a user by varying a power source voltage provided to the display areas sequentially (i.e., at different time points), in response to time points at which scan signals are provided to the display areas.

DETAILED DESCRIPTION

Figure 1:
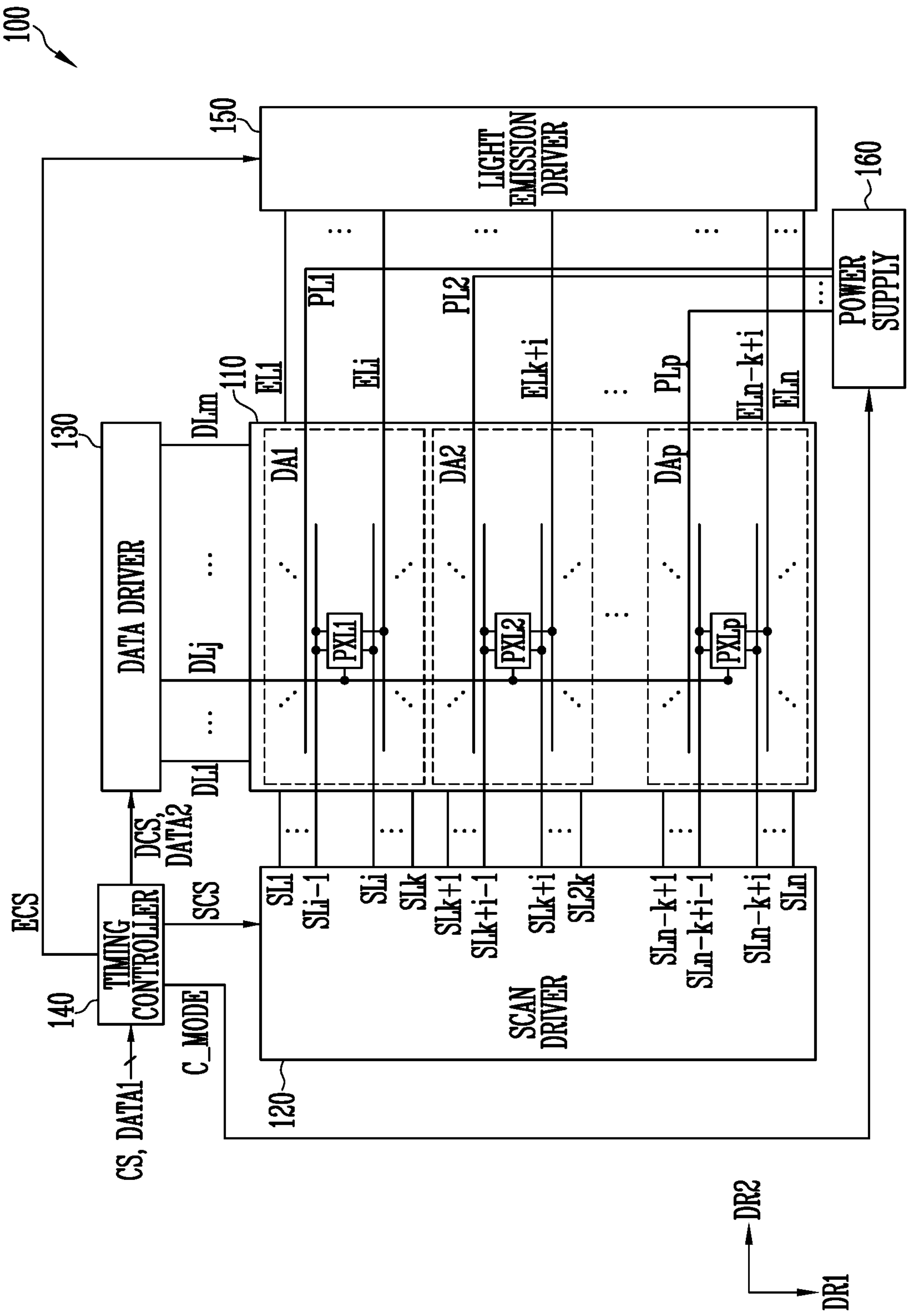
FIG. 1 is a block diagram illustrating a display device according to an exemplary embodiment of the present invention.

It will be apparent to those skilled in the art that various modifications and variations can be made in the present disclosure without departing from the spirit or scope of the disclosure, and specific exemplary embodiments are exemplified in the drawings and explained in the detailed description. However, the present invention is not limited to the exemplary embodiments disclosed hereinafter and can be implemented in various forms.

Some of the elements not directly related to the features of the present invention in the drawing may be omitted in order to clearly illustrate the present invention. In addition, some of the elements in the drawing can be shown in somewhat exaggerated sizes, ratios, and the like. For the same or similar constituent elements throughout drawing, the same reference numerals and symbols are to be given as much as possible even if they are displayed on different drawings, and duplicate descriptions will be omitted.

FIG. 1 is a block diagram illustrating a display device according to an exemplary embodiment of the present invention.

Referring to FIG. 1, a display device 100 may include a display unit 110, a scan driver 120 (or gate driver), a data driver 130 (or source driver), a timing controller 140, an emission driver 150, and a power supply 160.

The display unit 110 may include a plurality of scan lines SL1 to SLn (where n is a positive integer) (or a plurality of gate lines), a plurality of data lines DL1 to DLm (where m is a positive integer), a plurality of light emission control lines EL1 to ELn, a plurality of power lines PL1 to PLp (where p is a positive integer), and a plurality of pixels PXL1 to PXLp.

The scan lines SL1 to SLn may be arranged along a first direction DR1, each thereof may extend in a second direction DR2. The light emission control lines EL1 to ELn may be arranged along the first direction DR1, each thereof may extend in the second direction DR2. The data lines DL1 to DLm may be arranged along the second direction DR2, each thereof may extend in the first direction DR1. The data lines DL1 to DLm may be disposed across display areas DA1 to DAp described below and may be connected to the pixels PXL1 to PXLp in the display areas DA1 to DAp.

The pixels PXL1 to PXLp may be located at areas (e.g., pixel areas) partitioned by scan lines SL1 to SLn, the data lines DL1 to DLm, and the light emission control lines EL1 to ELn.

In an exemplary embodiment, the display unit 110 may include the display areas DA1 to DAp. Each of the display areas DA1 to DAp may be divided with respect to some of scan lines SL1 to SLn, for example, be sequentially arranged in the first direction DR1. As will be described later, the number of display areas DA1 to DAp (i.e., p) may be greater than or equal to 10, but is not limited thereto and any suitable number of display areas may be provided as would be understood by those skilled in the art.

In an exemplary embodiment, each of the display areas DA1 to DAp may include k (where k is a positive integer) scan lines, k light emission control lines, a power line, and pixels commonly connected to the power line.

For example, first to k-th scan lines SL1 to SLk, a first power line PL1, and a first pixel PXL1 (or, first pixels) may be provided in the first display area DA1. The first pixel PXL1 may be connected to at least one of the first to k-th scan lines SL1 to SLk (e.g., i-th scan line SLi (where i is a positive integer less than or equal to k) and i−1-th scan line SLi−1), one of the data lines DL1 to DLm (e.g., j-th data line DLj (where j is a positive integer)), one of first to k-th light emission control lines EL1 to ELk (e.g., i-th light emission control line ELi), and the first power line PL1.

For example, k+1-th to 2k-th scan lines SLk+1 to SL2*k*, a second power line PL2, and a second pixel PXL2 (or second pixels) may be provided in a second display area DA2, and the second pixel PXL2 may be connected to a k+i-th scan line SLk+i, a k+i−1-th scan line SLk+i−1, a j-th data line DLj, a k+1-th light emission control line ELk+i, and a second power line PL2.

For example, n-k+1-th to n-th scan lines SLn-k+1 to SLn, a p-th power line PLp, and a p-th pixel PXL2 (or p-th pixels) may be provided in a p-th display area DAp, and the p-th pixel PXLp may be connected to a n-k+i-th scan line SLn-k+i, a n-k+i−1-th scan line SLn-k+i−1, a j-th data line DLj, a n-k+1-th light emission control line ELn-k+i, and a p-th power line PLp.

Although the display areas DA1 to DAp are shown to include the same sizes (or areas) and the same number of scan lines in FIG. 1, various other embodiments are not limited thereto. For example, at least some of the display areas DA1 to DAp may include different sizes and/or different numbers of scan lines.

Each of the pixels PXL1 to PXLp may be initialized in response to a scan signal (or a scan signal provided at a previous time point, e.g., a previous gate signal) provided through a previous scan line SLi−1, may store or record a data signal provided through the data line DLj in response to a scan signal (or a scan signal provided at a current time point, e.g., a gate signal) provided through the scan line SLi, and may emit light at a brightness corresponding to the stored data signal in response to the light emission control signal provided through the light emission control line ELi.

The scan driver 120 may generate the scan signal based on a scan control signal SCS and provide the scan signal to the scan lines SL1 to SLn sequentially. The scan control signal SCS may include start signals, clock signals, and any other suitable signals, and may be provided by the timing controller 140. For example, the scan driver 120 may include a shift register (or a stage) that generates (e.g., sequentially generates) and outputs a pulse-type scan signal corresponding to a pulse-type start signal using clock signals.

The light emission driver 150 may generate the light emission control signal based on a light emitting driving control signal ECS and provide the light emission control signal to the light emission control lines EL1 to ELn sequentially or concurrently (e.g., simultaneously). Here, the light emitting driving control signal ECS may include light emitting start signals, light emitting clock signals, and any other suitable signals, and may be provided from the timing controller 140. For example, the light emission driver 150 may include a shift register that sequentially generates and outputs a pulse-type light emission control signal corresponding to a pulse-type light emitting start signal using the light emitting clock signals.

The data driver 130 may generate data signals based on image data DATA2 and a data control signal DCS provided from the timing controller 140 and provide the data signals to the display unit 110 (or pixels PXL1 to PXLp). For example, the data control signal DCS may be a signal for controlling operation of the data driver 130, and may include a load signal (or a data enable signal) indicating an output of a valid data signal.

The timing controller 140 may receive input image data DATA1 and a control signal CS from the external (e.g., a graphic processor), generate the scan control signal SCS and the data control signal DCS based on the control signal CS, and convert the input image data DATA1 to generate image data DATA2. For example, the timing controller 140 may convert the input image data DATA1 that is in an RGB format into the image data DATA2 that is in an RGBG format conforming to a pixel arrangement in the display unit 110.

The power supply 160 may provide first and second power source voltages to the display unit 110. The power source voltages may be voltages required for operation of the pixels PXL1 to PXLp, and may have a higher voltage level than voltage levels of a first power source voltage and a second power source voltage. In addition, the power supply 160 may further provide an initial power source voltage to the display unit 110.

In an exemplary embodiment, the power supply 160 may provide or supply at least one of the first and second power source voltages to the power lines PL1 to PLp, but may vary at least one of the first and second power source voltages. For example, the power supply 160 may provide the first power source voltage to the power lines PL1 to PLp and vary the first power source voltage between the first voltage level and the second voltage level, and the first voltage level may be higher than the second voltage level.

In an exemplary embodiment, the power supply 160 may independently provide at least one of the first and second power source voltages to the power lines PL1 to PLp. For example, the power supply 160 may provide the first power source voltage to the power lines PL1 to PLp, vary the first power source voltage provided to the first power line PL1 at a first time point from the second voltage level to the first voltage level, and vary the first power source voltage provided to the second power line PL2 at a second time point different from the first time point from the second voltage level to the first voltage level.

In an exemplary embodiment, the power supply 160 may operate in a first mode or a second mode in response to a mode control signal C_MODE. The first mode may be a normal driving mode. For example, the display device 100 may be driven at a normal frequency (e.g., a driving frequency of 60 Hz) and the power supply 160 may maintain the first power source voltage at a constant level. The second mode may be a power saving driving mode. For example, the display device 100 may be driven at a lower frequency (e.g., a driving frequency of 30 Hz) that is lower than the normal frequency and the power supply 160 may periodically vary the first power source voltage.

An example configuration for changing the power source voltage provided to the power lines PL1 to PLp in the power supply 160 will be described later with reference to FIG. 5.

In an exemplary embodiment, at least one of the scan driver 120, the data driver 130, the timing controller 140, the light emission driver 150, and the power supply 160 may be formed in the display unit 110 or may be implemented as an IC and connected to the display unit 110 in a form of a tape carrier package. In addition, at least two of the scan driver 120, the data driver 130, the timing controller 140, and the light emission driver 150 may be implemented as one IC.

Figure 2:
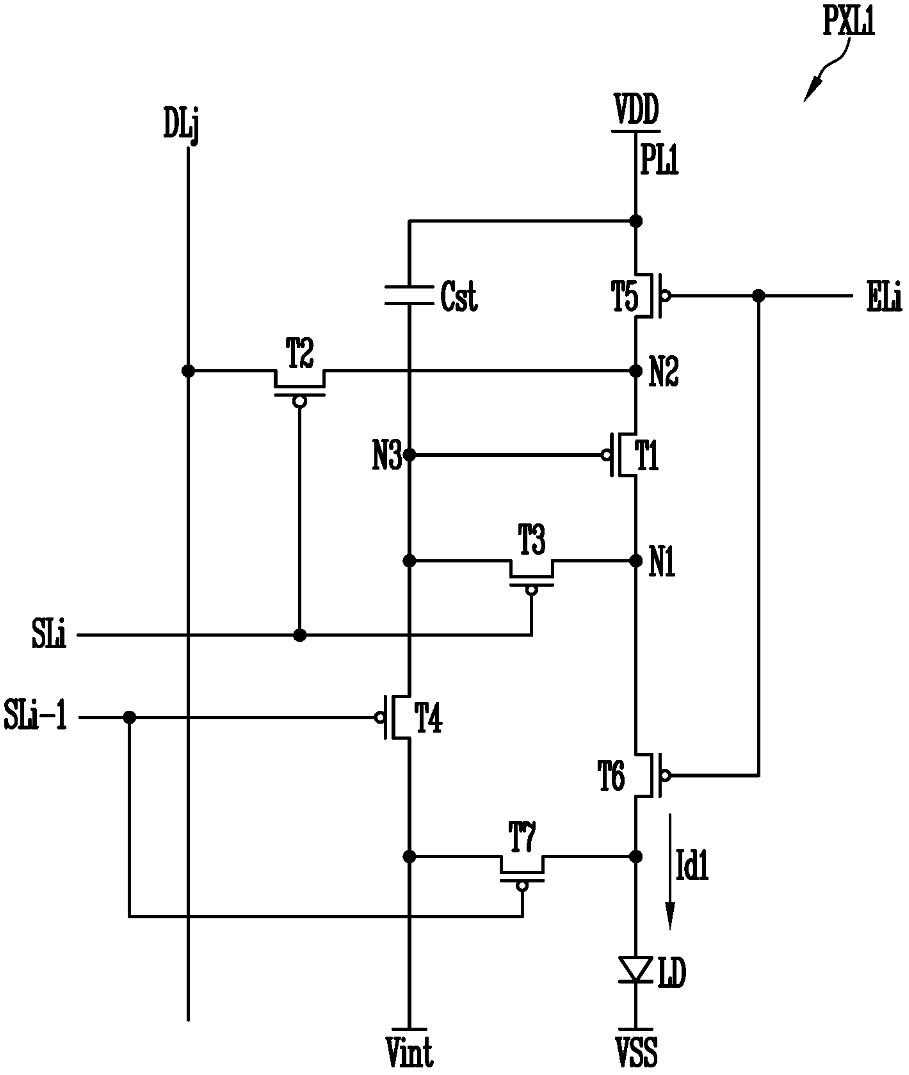
FIG. 2 is a circuit diagram illustrating an example of a first pixel included in the display device of FIG. 1.

FIG. 2 is a circuit diagram illustrating an example of a first pixel included in a display device of FIG. 1. Because the pixels PXL1 to PXLp shown in FIG. 1 are substantially equivalent to each other, the first pixel PXL1 will be described and the description is applicable for each of the pixels PXL1 to PXLp.

Referring to FIG. 2, the first pixel PXL1 may include first to seventh transistors T1 to T7, a storage capacitor Cst and a light emitting element LD.

Each of the first to seventh transistors T1 to T7 may be implemented as a P-type transistor, but is not limited thereto. For example, at least some of the first to seventh transistors T1 to T7 may be implemented as N-type transistors.

A first electrode of the first transistor T1 may be connected to a second node N2 or may be connected to the first power line PL1 (i.e., a power line for transferring the first power source voltage VDD) via a fifth transistor T5. A second electrode of the first transistor T1 may be connected to a first node N1 or may be connected to an anode of the light emitting element LD via a sixth transistor T6. A gate electrode of the first transistor T1 may be connected to a third node N3. The first transistor T1 may control an amount of current (i.e., a first driving current Id1) flowing from the first power line PL1 to a common power line (i.e., a power supply line for transferring a second power source voltage VSS) via the light emitting element LD in response to a voltage of the third node N3.

The second transistor T2 may be connected between the data line DLj and the second node N2. A gate electrode of the second transistor T2 may be connected to the scan line SLi. The second transistor T2 may be turned on when a scan signal is supplied to the scan line SLi to electrically connect the data line DLj and the first electrode of the first transistor T1.

The third transistor T3 may be connected between the first node N1 and the third node N3. A gate electrode of the third transistor T3 may be connected to the scan line SLi. The third transistor T3 may be turned on when a scan signal is supplied to the scan line SLi to electrically connect the first node N1 and the third node N3. Therefore, when the third transistor T3 is turned on, the first transistor T1 may be connected in a form of a diode (i.e., may be diode-connected).

The storage capacitor Cst may be connected between the first power line PL1 and the third node N3. The storage capacitor Cst may store a voltage corresponding to the data signal and a threshold voltage of the first transistor T1.

The fourth transistor T4 may be connected between the third node N3 and the initialization power line (i.e., the power line for transferring the initialization power source voltage Vint). A gate electrode of the fourth transistor T4 may be connected to a previous scan line SLi−1. The fourth transistor T4 may be turned on when a scan signal is supplied to the previous scan line SLi−1 to supply the initialization power source voltage Vint to the first node N1. Here, the initialization power source voltage Vint may be set to have a lower voltage level than the data signal.

The fifth transistor T5 may be connected between the first power line PL1 and the second node N2. A gate electrode of the fifth transistor T5 may be connected to a light emission control line ELi. The fifth transistor T5 may be turned off when the light emission control signal is supplied to the light emission control line ELi, and may be turned on in other cases.

The sixth transistor T6 may be connected between the first node N1 and the light emitting element LD. A gate electrode of the sixth transistor T6 may be connected to the light emission control line ELi. The sixth transistor T6 may be turned off when the light emission control signal is supplied to the light emission control line ELi, and may be turned on in other cases.

The seventh transistor T7 may be connected between the initialization power line and the anode of the light emitting element LD. A gate electrode of the seventh transistor T7 may be connected to the previous scan line SLi−1. The seventh transistor T7 may be turned on when a scan signal is supplied to the previous scan line SLi−1 to supply the initialization power source voltage Vint to the anode of the light emitting element LD.

The anode of the light emitting element LD may be connected to the first transistor T1 via the sixth transistor T6 and the cathode may be connected to the common power line. The light emitting element LD may generate light of a brightness (e.g., a predetermined brightness) in response to the first driving current Id1 supplied from the first transistor T1. The first power source voltage VDD may be set to have a voltage level higher than the second power source voltage VSS so that the first driving current Id1 flows to the light emitting element LD.

In an exemplary embodiment, in FIG. 2, the power line to which the first power source voltage VDD is applied is described as being the first power line PL1, and the power line to which the second power source voltage VSS is applied is described as being the common power line, but is not limited thereto. For example, the power line to which the first power source voltage VDD is applied may be the common power line, and the power line to which the second power source voltage VSS is applied may be the first power line PL1.

Figure 3A:
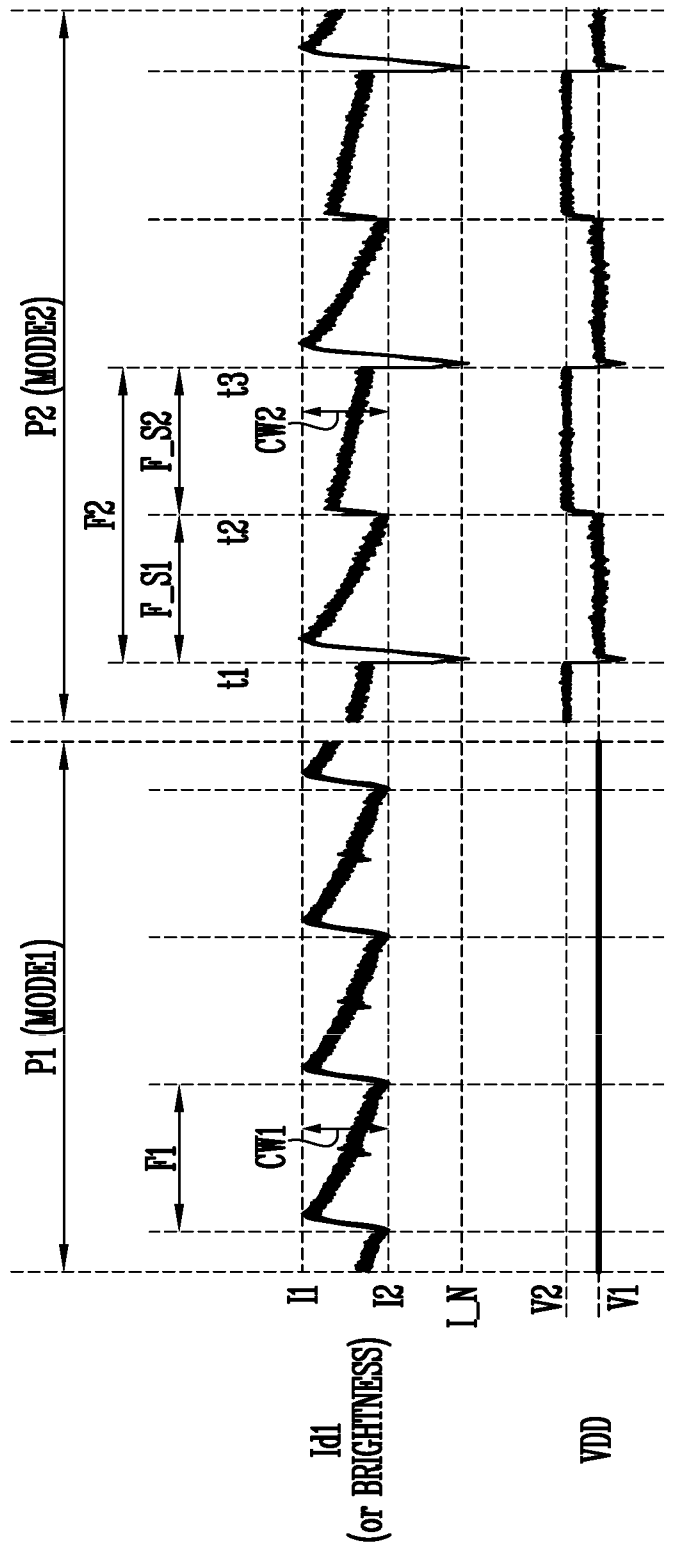
FIG. 3A is a waveform diagram illustrating an example embodiment of signals measured in the first pixel of FIG. 2.

FIG. 3A is a waveform diagram illustrating an example of signals measured in a first pixel of FIG. 2.

Referring to FIGS. 1-3A, the power supply 160 (and the display device 100) may operate in a first mode MODE1 in the first period P1 and in a second mode MODE2 in the second period P2.

In the first period P1, the first power source voltage VDD may have a first voltage level V1 and may be maintained at a constant level throughout the first period P1.

The first driving current Id1 (corresponding to a brightness BRIGHTNESS of the display unit 110 including the first pixel PXL1) may be varied in a period of a first frame period F1. The first frame period F1 may be a period in which one frame image is displayed.

For example, at a starting time point of the first frame period F1, a data signal may be written to the first pixel PXL1 according to an operation of the second transistor T2 and the third transistor T3 of the first pixel PXL1, and then the first driving current Id1 may rise to have a first current value I1 according to an operation of the fifth transistor T5 and the sixth transistor T6.

In an exemplary embodiment, the first driving current Id1 may leak through the third transistor T3 and the fourth transistor T4, a node voltage of the third node N3 may change due to a leakage current as time elapses in the first frame period F1, the first driving current Id1 may decrease (e.g., may be continuously decreased), and the first driving current Id1 may be reduced to have a second current value I2. The second current value I2 may be less than the first current value I1.

Because a change width CW1 (or a change amount, a change ratio) of the first driving current Id1 in the first period P1 (or the first frame period F1) is less than 1% of the maximum current, the change width CW1 of the first driving current Id1 or the brightness change resulting therefrom may not be seen by the user.

In the second period P2, the first power source voltage VDD may be periodically varied and may have the first voltage level V1 and the second voltage level V2 alternately. For example, the first power source voltage VDD may be varied in a period of the second frame period F2. The second frame period F2 may be a period for displaying one frame image in the second mode MODE2 and may be greater than the first frame period F1.

In exemplary embodiments, the first power source voltage VDD may have a first voltage level V1 in the first sub-period F_S1 and have a second voltage level V2 in the second sub-period F_S2. The first sub-period F_S1 may correspond to the first frame period F1 and the second sub-period F_S2 may be the other period except for the first sub-period F_S1 in the second frame period F2. The second voltage level V2 may be greater than the first voltage level V1. For example, the second voltage level V2 may be greater than the first voltage level V1 by about 10%.

A voltage level of the first power source voltage VDD at the first time point t1 may change from the second voltage level V2 to the first voltage level V1, and a voltage level of the first power source voltage VDD at the second time point t2 may change from the first voltage level V1 to the second voltage level V2. The first power source voltage VDD at the third time point t3 may be the same as the first power source voltage VDD at the first time point t1.

The first driving current Id1 may be varied in a period of the second frame period F2. Because the first driving current Id1 in the first sub-period F_S1 is substantially the same as or similar to the first driving current Id1 in the first frame period F1, duplicate descriptions may be omitted.

At the first time point t1, the first driving current Id1 may have a noise current value I_N. The noise current value I_N may appear in a form of an impulse due to a transition of the first power source voltage VDD (i.e., a transition from the second voltage level V2 to the first voltage level V1) and may not be seen by the user. In addition, because the noise current value I_N or a noise is removed through a control of a transition speed of the first power source voltage VDD (or a removal of undershooting of the first power source voltage VDD), the noise current value I_N or the noise will be not considered.

At the second time point t2, the first driving current Id1 may rise from the second current value I2. Because the first power source voltage VDD changes from the first voltage level V1 to the second voltage level V2 at the second time point t2, a voltage difference applied to the first pixel PLX1 of FIG. 2 may rise, and accordingly the first driving current Id1 may rise.

In the second sub-period F_S2, the first driving current Id1 may be reduced (e.g., continuously reduced) by the leakage current.

The change width CW2 of the first driving current Id1 in the second period P2 (or the second frame period F2) may be substantially the same as the change width CW1 of the first driving current Id1 in the first period P1. That is, because the change widths CW1 and CW2 (or a change amount, a change ratio) of the first driving current Id1 in the first period P1 and the second period P2 are maintained constant, the change width CW1 of the first driving current Id1 or the brightness change resulting therefrom may not be seen by the user.

Figure 3B:
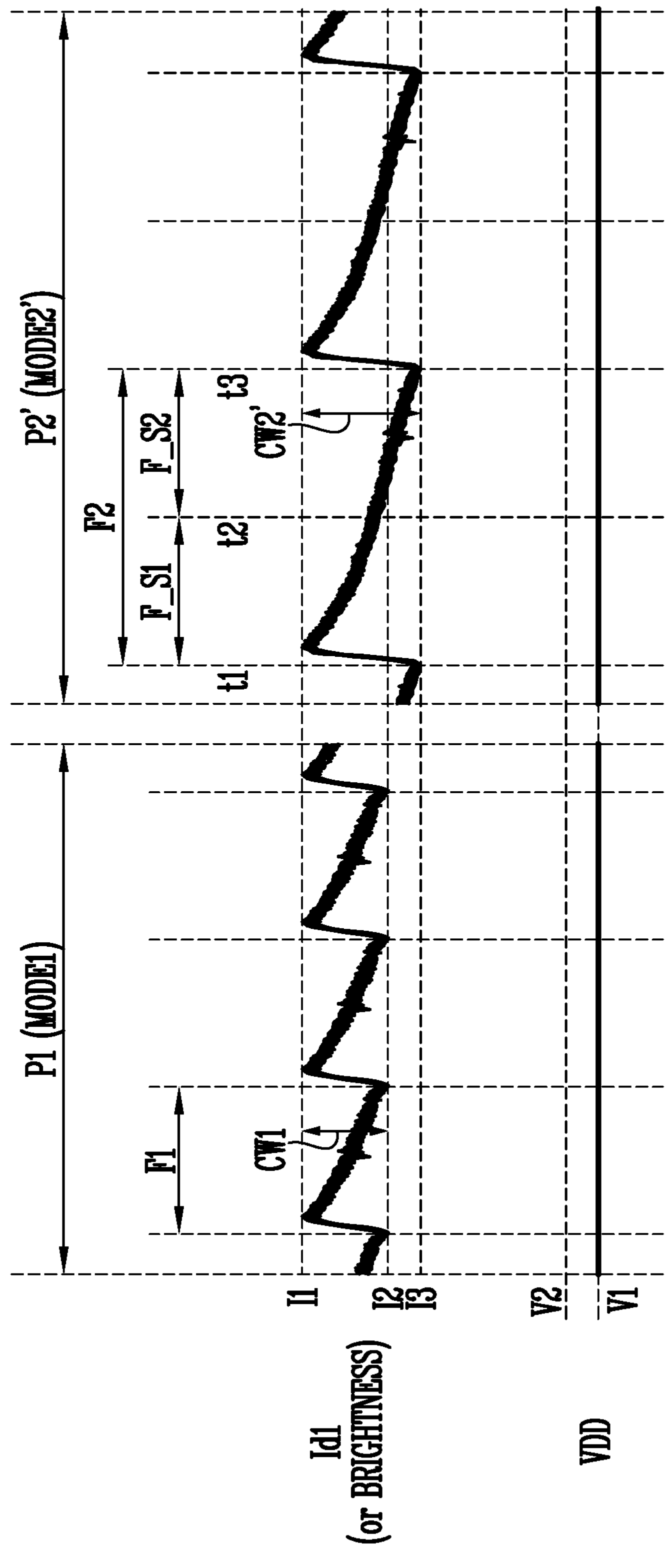
FIG. 3B is a waveform diagram illustrating an example embodiment of signals measured in the first pixel of FIG. 2.

FIG. 3B is a waveform diagram illustrating a comparative example of signals measured in a first pixel of FIG. 2. FIG. 3B shows waveforms of signals corresponding to FIG. 3A.

Referring to FIGS. 3A and 3B, because the first driving current Id1 and the first power source voltage VDD in the first period P1 shown in FIG. 3B are substantially the same as the first driving current Id1 and the first power source voltage VDD in the first period P1 shown in FIG. 3A, duplicate descriptions may be omitted.

In the second period P2', the display device may operate in the second mode MODE2' and may be driven with a low frequency. However, a voltage level of the first power source voltage VDD may be maintained constant at the first voltage level V1.

In this case, in the second sub-period F_S2 between the second time point t2 and the third time point t3, the first driving current Id1 may be reduced (e.g., continuously reduced) by the leakage current, and the first driving current Id1 may be reduced to have a third current value I3 that is less than the second current value I2.

The change width CW2' of the first driving current Id1 in the second period P2' may be greater than the change width CW1 of the first driving current Id1 in the first period P1. For example, the change width CW2' of the first driving current Id1 in the second period P2' may be about 1.5 times or more than the change width CW1 of the first driving current Id1 in the first period P1. In this case, the change width CW2' of the first driving current Id1 and the brightness change resulting therefrom may be seen by the user.

Therefore, the display device 100 according to exemplary embodiments of the present invention may periodically vary the first power source voltage VDD through the power supply 160 when operating in the second mode MODE2 or when driving with a low frequency, thereby compensating for a reduction of the first driving current Id1 and a reduction in brightness due to the leakage current and mitigating a degradation of a display quality of an image due to a periodic change in brightness.

In an exemplary embodiment, the first power source voltage VDD is described as being varied in FIGS. 3A and 3B, but the present invention is not limited thereto. For example, the second power source voltage VSS (see FIG. 2) may be varied, which will be described later with reference to FIG. 11.

Figure 4:
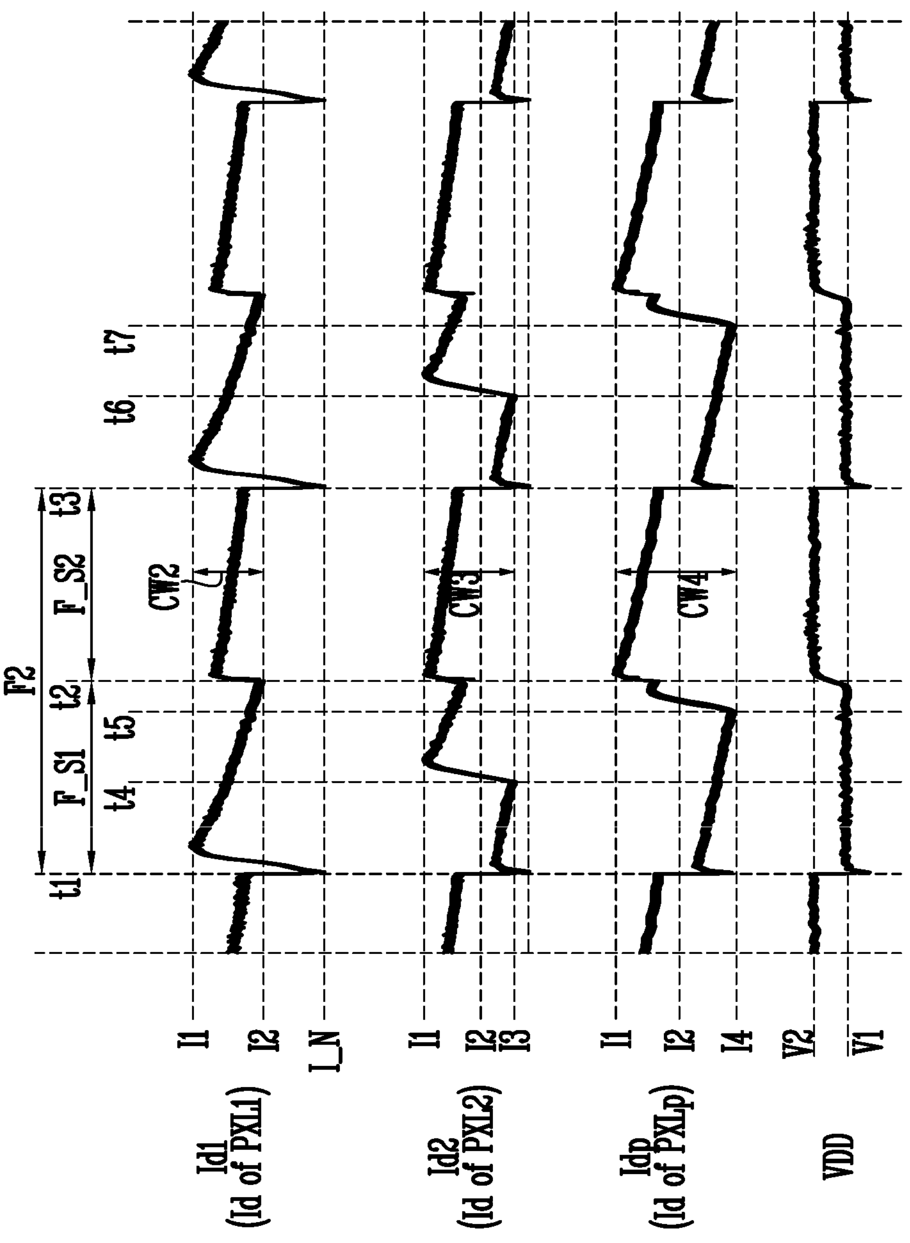
FIG. 4 is a waveform diagram illustrating an example embodiment of signals measured in pixels included in the display device of FIG. 1.

FIG. 4 is a waveform diagram illustrating a comparative example of signals measured in pixels included in a display device of FIG. 1.

Referring to FIGS. 1, 3A and 4, the first power source voltage VDD may be substantially the same as the first power source voltage VDD in the second period P2 described with reference to FIG. 3A. In addition, the first driving current Id1 flowing through the first pixel PXL1 may be substantially the same as the first driving current Id1 in the second period P2 described with reference to FIG. 3A. Therefore, duplicate descriptions may be omitted.

The second driving current Id2 may rise to have the first current value I1 at the fourth time point t4. As described with reference to FIG. 1, scan signals may be provided (e.g., sequentially provided) to the scan lines SL1 to SLn. A scan signal of the gate-on voltage level may be provided to the second pixel PXL2 at the fourth time point t4 after the first time point t1, and a data signal may be written to the second pixel PXL2. Here, the gate-on voltage level may be a voltage level for turning on the transistors (e.g., the second transistor T2) described with reference to FIG. 2. Thereafter, the light emission control signal of the gate-on voltage level is provided, and the second driving current Id2 may be increased.

The second driving current Id2 may be reduced (e.g., gradually reduced) by the leakage current at a period between the fourth time point t4 and the second time point t2, and the second driving current Id2 may be increased in response to a rise of the first power source voltage VDD at the second time point t2.

Thereafter, the second driving current Id2 may be reduced by the leakage current at a period between the second time point t2 and the sixth time point t6. However, the second driving current Id2 may be drastically reduced in response to a falling of the first power source voltage VDD at the third time point t3 between the second time point t2 and the sixth time point t6. The second driving current Id2 may have a third current value I3 that is less than the second current value I2 at the sixth time point t6 (and the fourth time point t4).

The change width CW3 of the second driving current Id2 in the second period P2 may be greater than the change width CW2 of the first driving current Id1 in the second period P2. For example, the change width CW3 of the second driving current Id2 may be about 1.5 times or more of the change width CW2 of the first driving current Id1. In this case, the change width CW3 of the second driving current Id2 and the brightness change resulting therefrom may be seen by the user.

Similarly to the second driving current Id2, a p-th driving current Idp may rise to have the first current value I1 at the fifth time point t5. Because the scan signals are provided (e.g., sequentially provided) to the scan lines SL1 to SLn, the scan signal of the gate-on voltage level may be provided to a p-th pixel PXLp, and the data signal may be written to the p-th pixel PXLp at the fifth time point t5 after the first time point t1 and the fourth time point t4. Thereafter, the light emission control signal of the gate-on voltage level may be provided, and the p-th driving current Idp may be increased. In addition, the p-th driving current Idp may be increased in response to the rise of the first power source voltage VDD at the second time point t2.

The p-th driving current Idp may be reduced by the leakage current in a period between the second time point t2 and the seventh time point t7. However, the p-th driving current Idp may be drastically reduced in response to the falling of the first power source voltage VDD at the third time point t3 between the second time point t2 and the seventh time point t7. The p-th driving current Idp may have a fourth current value I4 that is less than the second current value I2 (and the third current value I3) at the seventh time point t7 (and the fifth time point t5).

The change width CW4 of the p-th driving current Idp in the second period P2 may be greater than the change width CW2 of the first driving current Id1 in the second period P2. For example, the change width CW4 of the p-th driving current Idp may be about twice or more the change width CW2 of the first driving current Id1. In this case, the change width CW4 of the p-th driving current Idp and the brightness change resulting therefrom may be more easily seen by the user.

For example, as compared with the embodiment in which the first power source voltage VDD is maintained constant without being varied as described with reference to FIG. 3B, the brightness change of the first pixel PXL1 may be mitigated, but the brightness change of the second pixel PXL2 may not be mitigated and the brightness change of the p-th pixel PXLp also may not be mitigated (e.g., the brightness is rather degraded).

Accordingly, the display device 100 (and the power supply 160) according to embodiments of the present invention may sequentially vary the first power source voltage VDD (and/or the second power source voltage VSS, see FIG. 2) provided to the pixels PXL1 to PXLp (or display areas DA1 to DAp, see FIG. 1) and the power lines PL1 to PLp.

Figure 5:
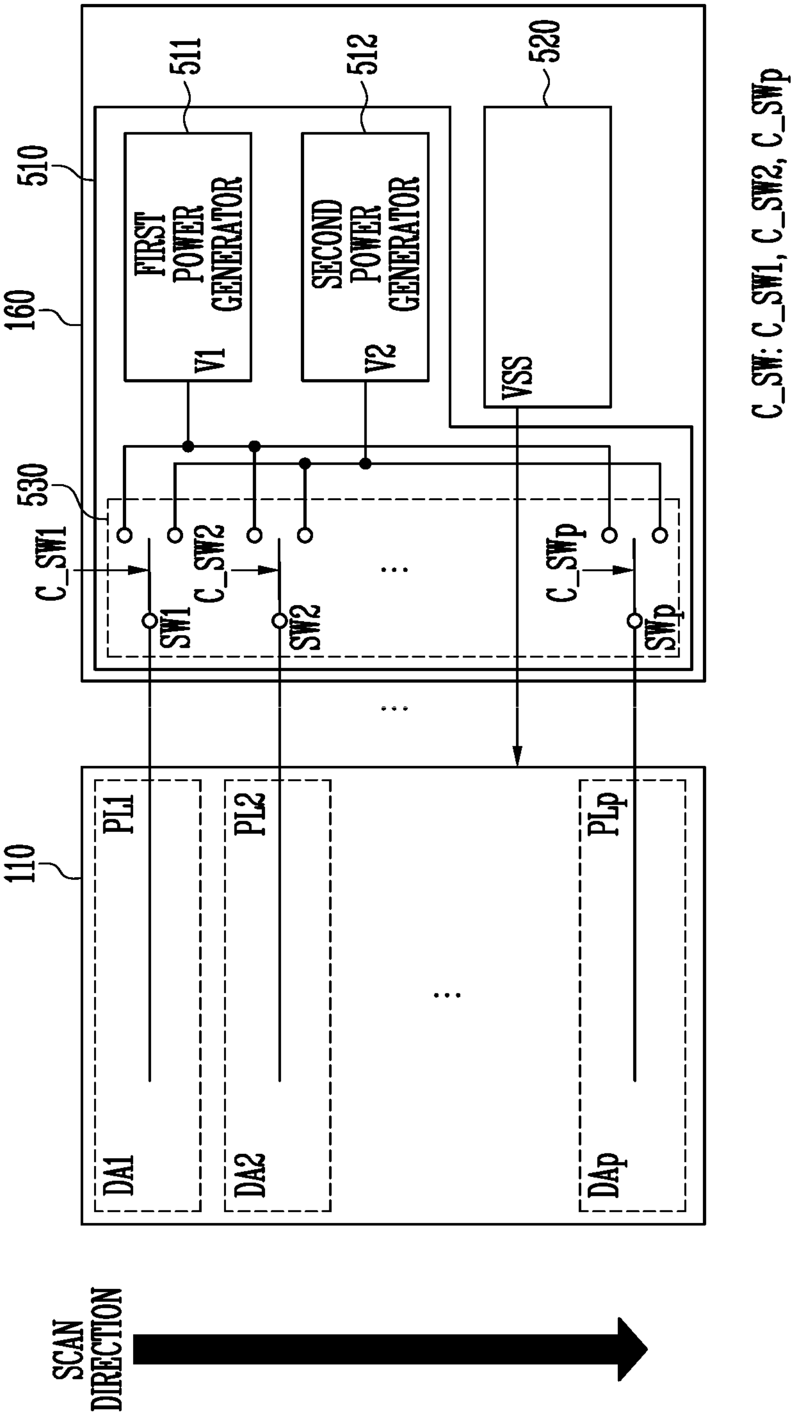
FIG. 5 is a drawing illustrating an example embodiment of the power supply included in a display device of FIG. 1.

FIG. 5 is a drawing illustrating an example of a power supply included in a display device of FIG. 1.

Referring to FIGS. 1 and 5, the power supply 160 may include a first power supply 510 (or a first power supply block) and a second power supply 520 (or a second power supply block). Each of the first power supply 510 and the second power supply 520 may be implemented as a PMIC or may include a PMIC.

The second power supply 520 may generate the second power voltage VSS and may provide the second power source voltage VSS to the display unit 110. The second power source voltage VSS may be commonly provided to the display areas DA1 to DAp of the display unit 110.

The first power supply 510 may generate the first power source voltage VDD and may provide the first power source voltage VDD to the display unit 110.

In exemplary embodiments, the first power supply 510 may include a first power generator 511 (or a first power generation circuit), a second power generator 512 (or a second power generation circuit), and a switching unit 530.

The first power generator 511 may generate the power source voltage having the first voltage level V1 and the second power generator 512 may generate the power source voltage having the second voltage level V2. The first voltage level V1 and the second voltage level V2 may be the same as the first voltage level V1 and the second voltage level V2 described with reference to FIG. 3A, respectively. Each of the first power generator 511 and the second power generator 512 may be implemented as a PMIC.

The switching unit 530 may independently connect the power lines PL1 to PLp to one of the first power generator 511 and the second power generator 512 in response to a switch control signal C_SW. Here, the switch control signal C_SW may be provided from a timing controller 140 (see FIG. 1), but not limited thereto, and may be provided from, for example, a scan driver 120, a light emission driver 150, and the like.

The switching unit 530 may include a plurality of switches SW1 to SWp. The switches SW1 to SWp may be implemented as transistors (e.g., P-type transistors or N-type transistors).

The first switch SW1 may connect first power line PL1 to one of the first power generator 511 and the second power generator 512 in response to a first switch control signal C_SW1.

Figure 6:
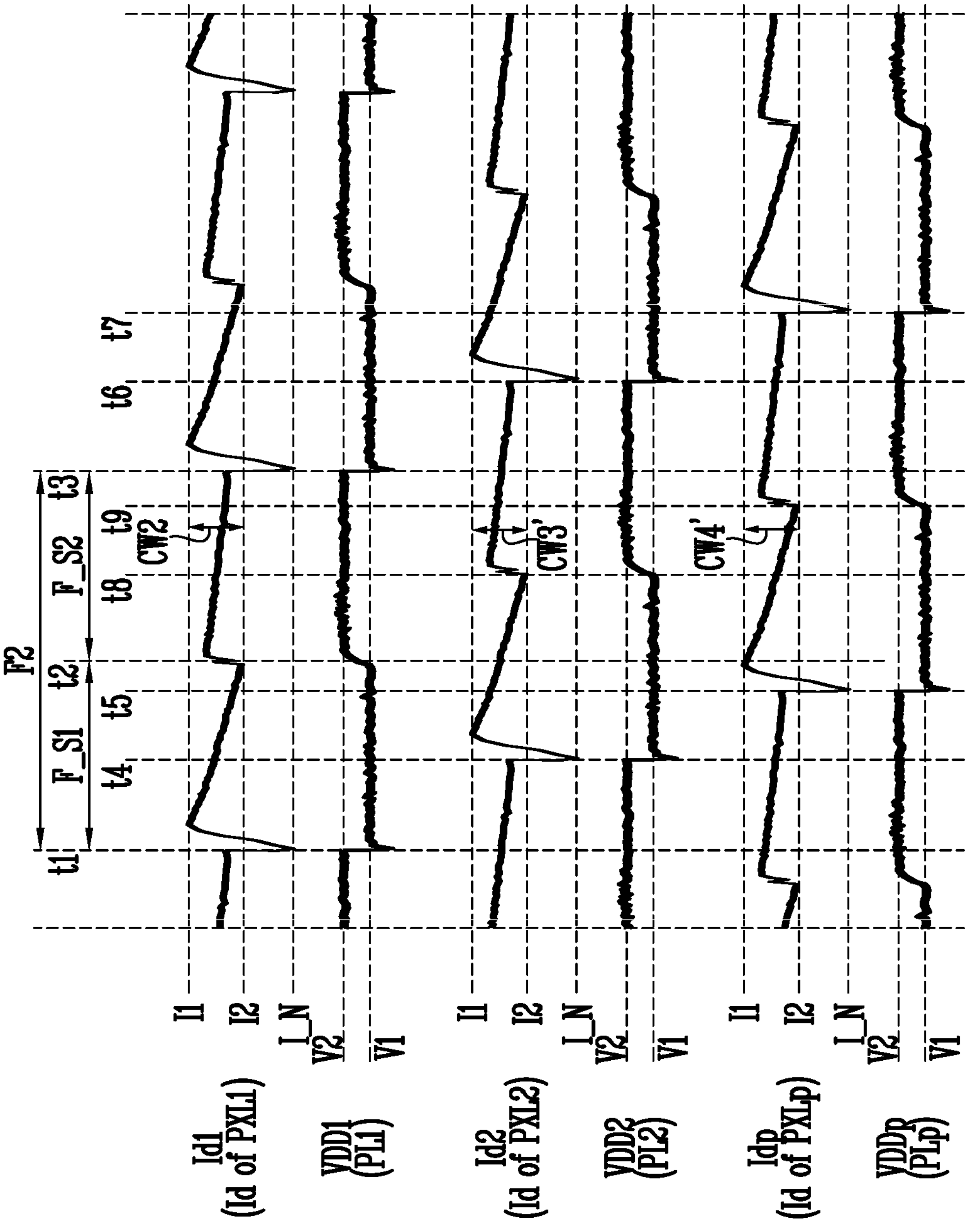
FIG. 6 is a waveform diagram illustrating an example embodiment of signals measured in pixels included in the display device of FIG. 1.

Similarly, the second switch SW2 may connect the second power line PL2 to one of the first power generator 511 and the second power generator 512 in response to a second switch control signal C_SW2. Referring to FIG. 6, the second switch control signal C_SW2 may have the same waveform as the first switch control signal C_SW1 and may be delayed with respect to the first switch control signal C_SW1. For example, the switch control signal may be provided to the first switch SW1 and the second switch SW2 sequentially in response to a scan direction SCAN DIRECTION.

A p-th switch SWp may connect the p-th power line PLp to one of the first power generator 511 and the second power generator 512 in response to a p-th switch control signal C_SWp.

FIG. 6 is a waveform diagram illustrating an example of signals measured in pixels included in a display device of FIG. 1. FIG. 6 shows the signals measured in the second period P2 described with reference to FIG. 3A.

Referring to FIGS. 1, 3A, 5 and 6, the first voltage VDD1 provided to the first power line PL1 may be substantially the same as the first power source voltage VDD in the second period P2 described with reference to FIG. 3A. In addition, the first driving current Id1 flowing through the first pixel PXL1 may be substantially the same as the first driving current Id1 in the second period P2 described with reference to FIG. 3A. Therefore, duplicate descriptions may be omitted.

The second voltage VDD2 provided to the second power line PL2 may change from the second voltage level V2 to the first voltage level V1 at the fourth time point t4, and may change from the first voltage level V1 to the second voltage level V2 at the eighth time point t8. The second voltage VDD2 at the sixth time point t6 may be the same as the second voltage VDD2 at the fourth time point t4.

At the fourth time point t4, the scan signal of the gate-on voltage level may be provided to the second pixel PXL2 (e.g., see FIG. 1), and after (e.g., immediately after) the fourth time point t4, the second driving current Id2 flowing through the second pixel PXL2 may be increased.

At a period between the fourth time point t4 and the eighth time point t8, the second driving current Id2 may be reduced by the leakage current, and at the eighth time point t8, the second driving current Id2 may be the same as the second current value I2. The eighth time point t8 may be a time point after the first sub-period F_S1 and after an interval from the fourth time point t4. For example, an interval between the fourth time point t4 and the eighth time point t8 may be the same as an interval between the first time point t1 and the second time point t2.

At the eighth time point t8, the second driving current Id2 may rise in response to the rise of the second voltage VDD2.

At a period interval between the eighth time point t8 and the sixth time point t6, the second driving current Id2 may be reduced by the leakage current.

The change width CW3 'of the second driving current Id2 may be the same as the change width CW2 of the first driving current Id1.

For example, the second driving current Id2 may have the same waveform as the first driving current Id1, and may be delayed by an interval between the time points at which the scan signal provided (i.e., by an interval between the first time point t1 and the fourth time point t4). In addition, the second voltage VDD2 may have the same waveform as the first voltage VDD1, and may be delayed by an interval between the time points at which the scan signal is provided.

A p-th voltage VDDp provided to the p-th power line PLp may change from the second voltage level V2 to the first voltage level V1 at the fifth time point t5, and may change from the first voltage level V1 to the second voltage level V2 at the ninth time point t9. The p-th voltage VDDp at the seventh time point t7 may be the same as the p-th voltage VDDp at the fifth time point t5.

At the fifth time point t5, the scan signal of the gate-on voltage level may be provided to the p-th pixel PXLp (e.g., see FIG. 1), and immediately after the fifth time point t5 the second driving current Id2 flowing through the second pixel PXL2 may be increased.

The p-th driving current Idp may be reduced by the leakage current at a period between the fifth time point t5 and the ninth time point t9, and the p-th driving current Idp may be the same as the second current value I2 at the ninth time point t9. The ninth time point t9 may be a time point after the fifth sub-period F_S1 and after an interval from the fifth time point t5.

The p-th driving current Idp may rise in response to the rise of the p-th voltage VDDp at the ninth time point t9, and the p-th driving current Idp may be reduced by the leakage current at a period between the eighth time point t8 and the sixth time point t6.

The change width CW4' of the p-th driving current Idp may be the same as the change width CW2 of the first driving current Id1.

For example, the p-th driving current Idp may have the same waveform as the first driving current Id1, and may be delayed by a period between the time points at which the scan signal is provided (i.e., by the period between the first time point t1 and the fifth time point t5). In addition, the p-th voltage VDDp may have the same waveform as the first voltage VDD1, and may be delayed by a period between the time points at which the scan signal is provided.

As described with reference to FIGS. 5 and 6, the power supply 160 may sequentially vary the voltages VDD1 to VDDp (i.e., the voltages provided as the first power source voltage VDD) provided in the display areas DA1 to DAp in response to the time points at which scan signals are provided to the display areas DA1 to DAp, thereby reducing the change width (or the change ratio) of driving currents of the pixels PXL1 to PXLp included in the display areas DA1 to DAp within a reference width (e.g., the change width CW1 corresponding to the first mode MODE1), and preventing the brightness change from being seen by the user.

In an exemplary embodiment, the fourth time point t4 at which the second voltage VDD2 changes from the second voltage level V2 to the first voltage level V1 is described as being the same as the time point at which the scan signal is provided to the second pixel PXL2 (i.e., a k+i-th scan line SLk+i, see FIG. 1)) in FIG. 6, but is not limited thereto.

For example, the fourth time point t4 at which the second voltage VDD2 changes from the second voltage level V2 to the first voltage level V1 may be the same as the time point at which the scan signal is provided to the k+1-th scan line SLk+1 (e.g., see FIG. 1) (i.e., the first scan line of the second display area DA2). As another example, the fourth time point t4 at which the second voltage VDD2 changes from the second voltage level V2 to the first voltage level V1 may be the same as the time point at which the scan signal is provided to a 2k-th scan line SL2*k* (e.g., see FIG. 1) (i.e., the last scan line of the second display area DA2). A variable time point of the power source voltage will be described later with reference to FIG. 12.

Figure 7:
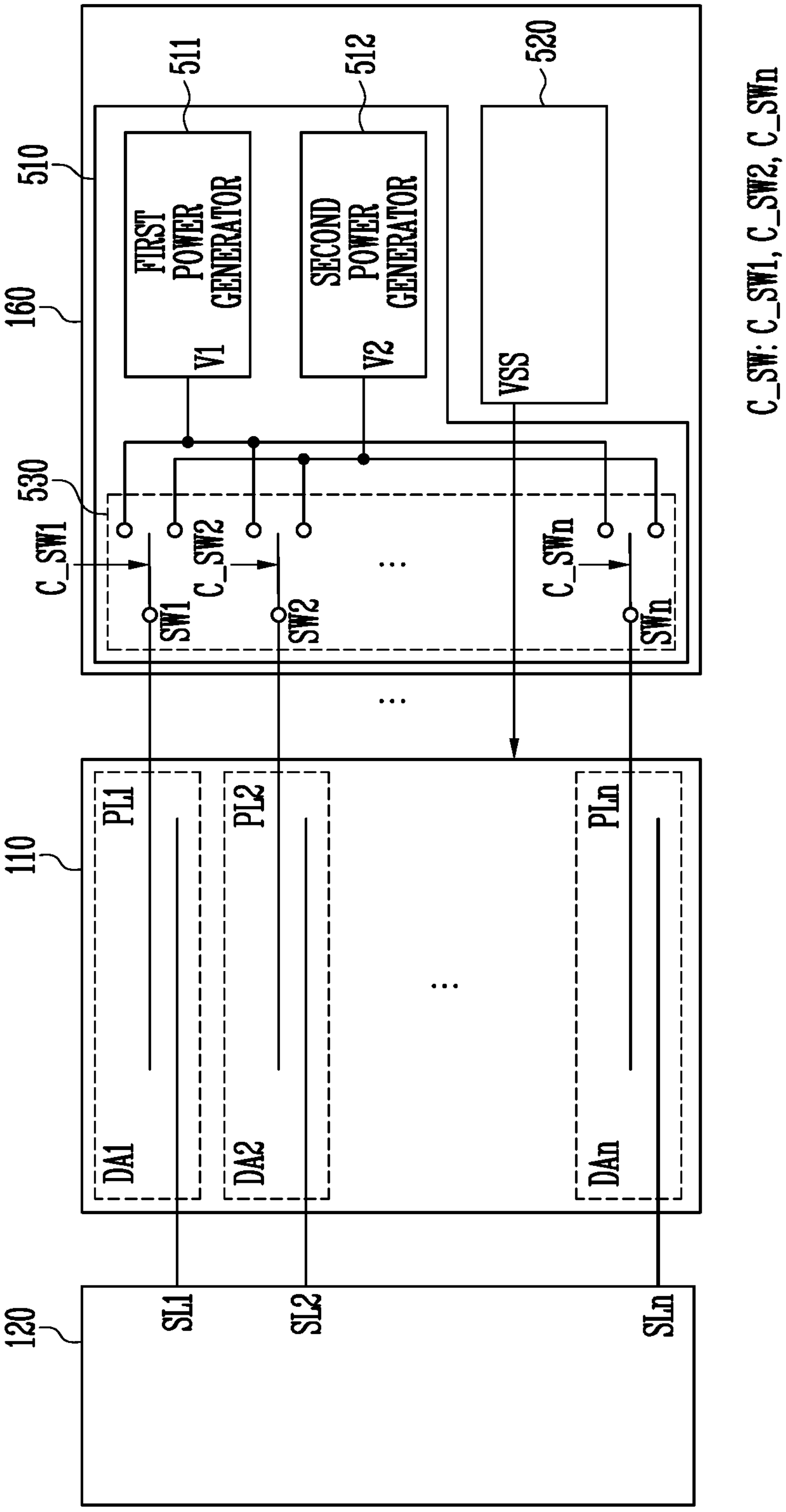
FIG. 7 is a drawing illustrating another example embodiment of a power supply included in the display device of FIG. 1.

FIG. 7 is a drawing illustrating another example of a power supply included in a display device of FIG. 1. FIG. 7 shows a power supply 160 corresponding to FIG. 5.

Referring to FIGS. 1, 5 and 7, the power supply 160 of FIG. 7 is different from the power supply 160 of FIG. 5 in that it includes first to n-th switches SW1 to SWn.

The display unit 110 may include display areas DA1 to DAn corresponding to each of scan lines SL1 to SLn (i.e., pixel rows), and may include power lines PL1 to PLn provided to each of the display areas DA1 to DAn.

The n-th switch SWn may connect the n-th power line PLn to one of the first power generator 511 and the second power generator 512 in response to the n-th switch control signal C_SWn.

The power supply 160 of FIG. 7 may vary (e.g., sequentially vary) the first power source voltage VDD provided in the display areas DA1 to DAn in response to the time points at which the scan signals are provided to SL1 to SLn by using the first to n-th switches SW1 to SWn.

Therefore, the power supply 160 may reduce or minimize the change width of each driving current of the pixels PXL1 to PXLp.

The power supply 160 of FIG. 5 uses the first to p-th switches SW1 to SWp (e.g., p is 10) and the first to p-th power lines PL1 to PLp, to reduce or minimize a dead space in which the first to p-th switches SW1 to SWp and the first to p-th power lines PL1 to PLp are disposed.

Figure 8:
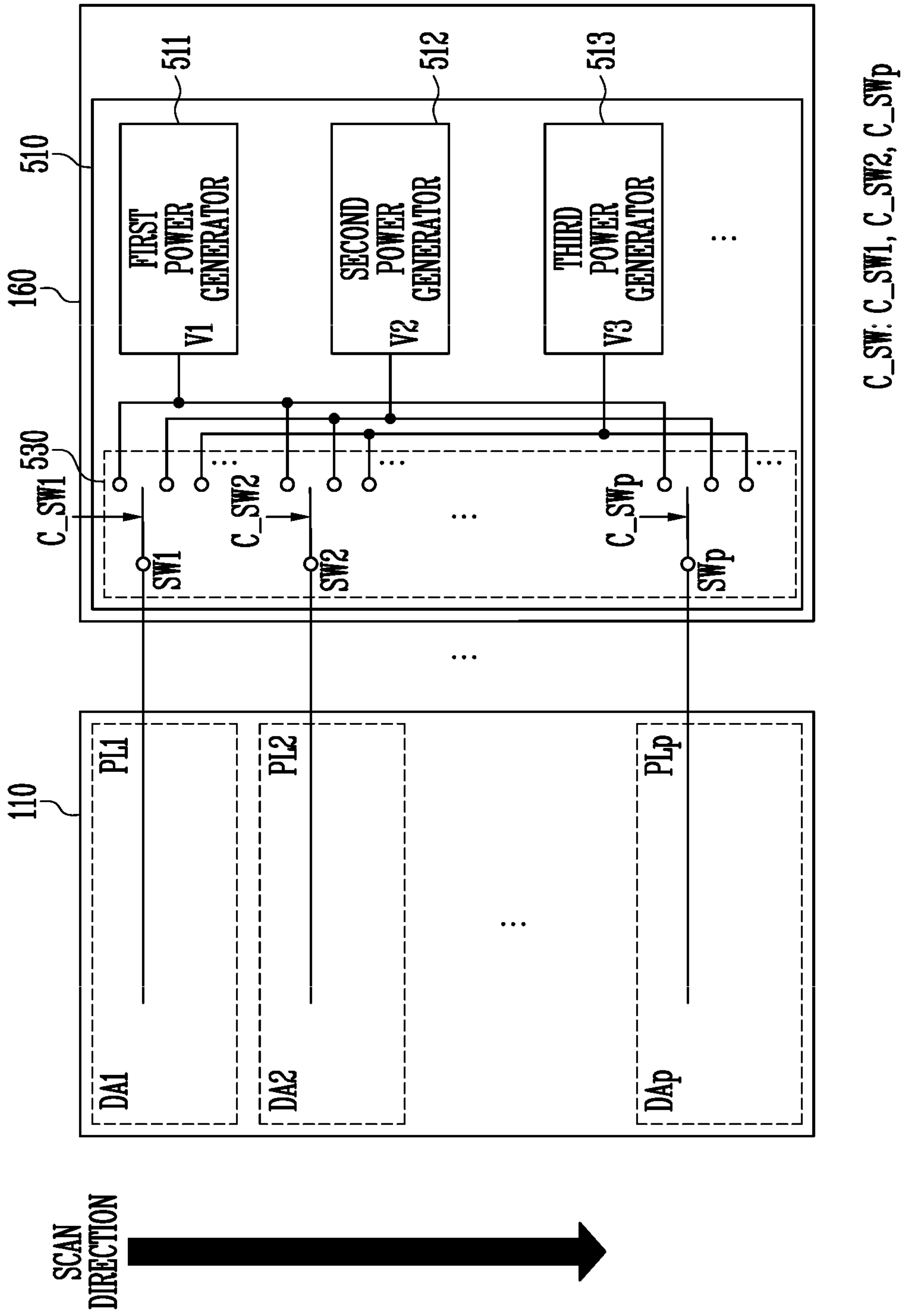
FIG. 8 is a drawing illustrating another example embodiment of a power supply included in the display device of FIG. 1.

FIG. 8 is a drawing illustrating another example of a power supply included in a display device of FIG. 1. FIG. 7 shows the power supply 160 corresponding to FIG. 5. For convenience of description, the second power supply 520 will be omitted in FIG. 8.

Referring to FIGS. 1, 5 and 8, the power supply 160 of FIG. 8 is different from the power supply 160 of FIG. 5 in that it includes three or more power generators 511, 512, and 513.

A third power generator 513 may generate a third voltage VDD3 with a third voltage level. Here, the third voltage level may be greater than the first voltage level V1 and less than the second voltage level V2 as described with reference to FIG. 3A.

The first switch SW1 may connect the first power line PL1 to one of the power generators 511, 512, and 513 in response to the first switch control signal C_SW1.

Similarly, the second switch SW2 may connect the second power line PL2 to one of the power generators 511, 512, and 513 in response to the second switch control signal C_SW2, and the p-th switch SWp may connect the p-th power line PLp to one of the power generators 511, 512, and 513 in response to the p-th switch control signal C_SWp.

In exemplary embodiments, when a target brightness of the display unit 110 or the first display area DA1 (or the first pixel PXL1) is greater than a reference brightness, the first switch SW1 may alternately connect the first power generator 511 and the second power generator 512 to the first power line PL1, and when the target brightness of the display unit 110 or the first display area DA1 is equal to or less than the reference brightness, the first switch SW1 may alternately connect the first power generator 511 and the third power generator 513 to the first power line PL1. The target brightness may be calculated based on grayscale values included in the image data DATA2 described with reference to FIG. 1. For example, the target brightness may be proportional to an average of the grayscale values.

Figure 9:
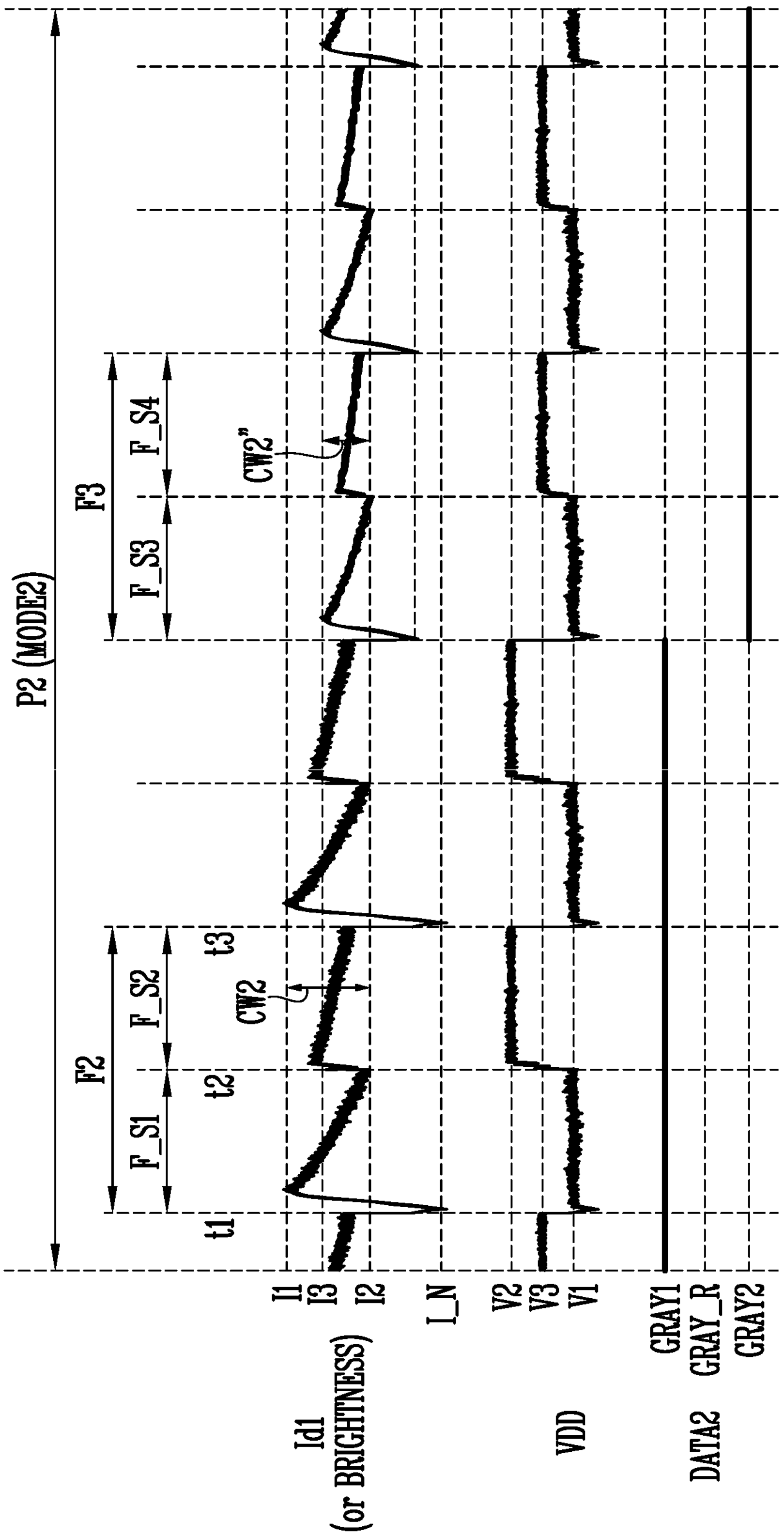
FIG. 9 is a drawing illustrating an example of signals measured in a power supply of FIG. 8.

FIG. 9 is a drawing illustrating an example of signals measured in a power supply of FIG. 8. FIG. 9 shows the signals measured in the second period P2 described with reference to FIG. 3A.

Referring to FIGS. 1, 3A, 8 and 9, the average (i.e., an average grayscale value) of the grayscale values included in the image data DATA2 in the second frame period F2 may be the same as a first average value GRAY1 and may be greater than a reference grayscale value GRAY_R.

In this case, the first power source voltage VDD may alternately have the first voltage level V1 and the second voltage level V2 as described with reference to FIG. 3A.

The average grayscale value may be the same as the second average value GRAY2 and may be less than the reference grayscale value GRAY_R at the third frame period F3.

In this case, the first power source voltage VDD may have a first voltage level V1 in the third sub-period F_S3 and may have a second voltage level V2 in the fourth sub-period F_S4. Here, the third sub-period F_S3 and the fourth sub-period F_S4 may correspond to the first sub-period F_S1 and the second sub-period F_S2, respectively.

As the average grayscale value is reduced, the driving current Id flowing through the pixels PXL1 to PXLp may be less and the change width CW2" of the driving current Id due to the leakage current may also be reduced.

Therefore, even if a swing range (or a swing width) of the first power source voltage VDD is reduced, the brightness change due to the change width CW of the driving current Id may not be seen by the user. As the swing range of the first power source voltage VDD is reduced, power consumption may be reduced.

Although the swing range of the first power source voltage VDD is described as being varied based on one reference grayscale value GRAY_R in FIG. 9, it is not limited thereto. The power supply 160 of FIG. 8 may output four or more voltages, and the display device 100 may use two or more reference grayscale values to further adjust the swing range of the first power source voltage VDD.

Figure 10:
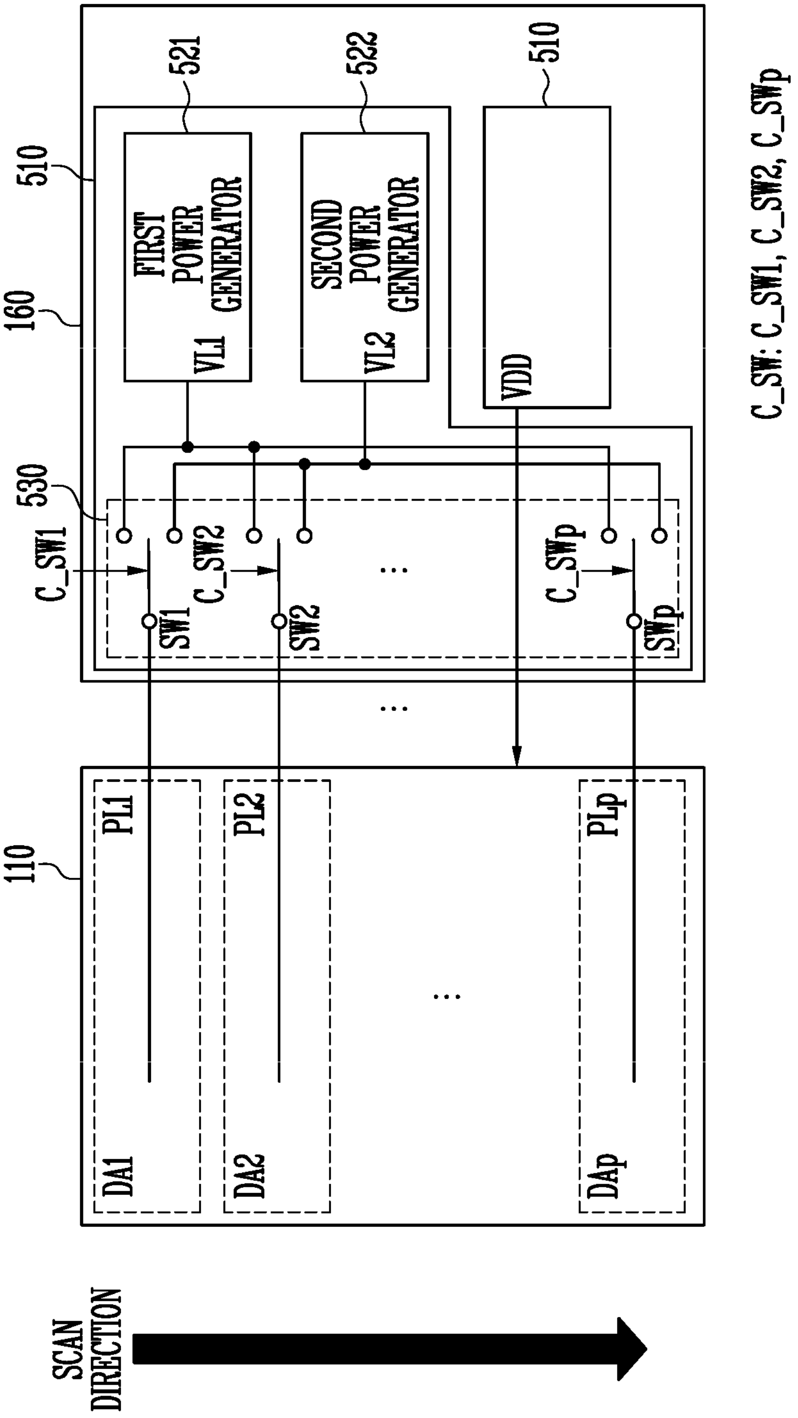
FIG. 10 is a drawing illustrating another example embodiment of a power supply included in the display device of FIG. 1.

FIG. 10 is a drawing illustrating another example of a power supply included in a display device of FIG. 1. FIG. 10 shows the power supply 160 corresponding to FIG. 5.

Referring to FIGS. 1, 5 and 10, the power supply 160 of FIG. 10 is different from the power supply 160 of FIG. 5 in that it varies the second power source voltage VSS instead of the first power source voltage VDD.

The first power supply 510 may generate a first power source voltage VDD and provide the first power source voltage VDD to the display unit 110. The first power source voltage VDD may be commonly provided to the display areas DA1 to DAp of the display unit 110.

The second power supply 520 may generate a second power source voltage VSS and provide the second power source voltage VSS to the display unit 110.

In exemplary embodiments, the second power supply 520 may include the first power generator 521 (or a first power generation circuit), the second power generator 522 (or a second power generation circuit), and a switching unit 530 (or a switching circuit).

The first power generator 521 may generate a power source voltage having a first low voltage level VL1, and the second power generator 512 may generate a power source voltage having a second low voltage level VL2. Here, the second low voltage level VL2 may be lower than the first low voltage level VL1. Each of the first power generator 521 and the second power generator 522 may be implemented as a PMIC.

The switching unit 530 may connect the power lines PL1 to PLp to one of the first power generator 521 and the second power generator 522 in response to the switch control signal C_SW.

The switching unit 530 may include a plurality of switches SW1 to SWp. The first switch SW1 may connect first power line PL1 to one of the first power generator 521 and the second power generator 522 in response to a first switch control signal C_SW1.

Similarly, the second switch SW2 may connect the second power line PL2 to one of the first power generator 521 and the second power generator 522 in response to a second switch control signal C_SW2. The p-th switch SWp may connect the p-th power line PLp to one of the first power generator 521 and the second power generator 522 in response to a p-th switch control signal C_SWp.

Figure 11:
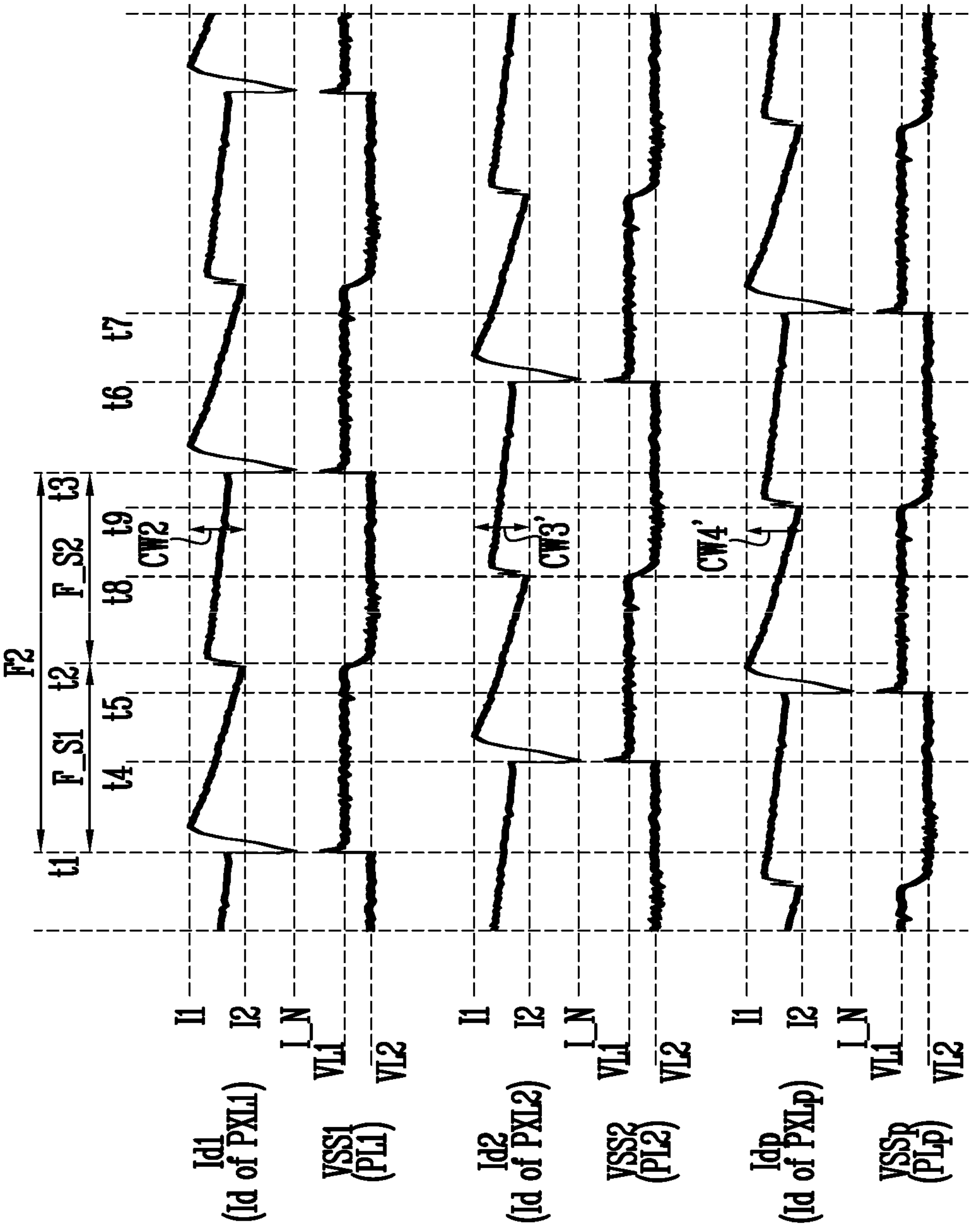
FIG. 11 is a drawing illustrating an example embodiment of signals measured in the power supply of FIG. 10.

FIG. 11 is a drawing illustrating an example of signals measured in a power supply of FIG. 10. FIG. 11 shows the signals corresponding to FIG. 6.

Referring to FIGS. 1, 6, 10 and 11, the first driving current Id1 flowing through the first pixel PXL1, the second driving current Id2 flowing through the second pixel PXL2, and the third driving current Id3 flowing through the third pixel PXL3 may be substantially the same as or similar to the first driving current Id1, the second driving current Id2, and the third driving current Id3, described with reference to FIG. 6, respectively. Therefore, duplicate descriptions may be omitted.

The first low voltage VSS1 provided to the first power line PL1 may change from the second low voltage level VL2 to the first low voltage level VL1 at the first time point t1 and have the first low voltage level VL1 during the first sub-period F_S1, and may change to have the second low voltage level VL2 at the second time point t2 and have the first low voltage level VL1 during the second sub-period F_S2. In addition, at the third time point t3, the first low voltage VSS1 may change to have the first low voltage level VL1.

Because the voltage level of the first low voltage VSS1 is lowered in the second sub-period F_S2, the voltage difference applied the first pixel PLX1 of FIG. 2 may rise. Therefore, the first driving current Id1 may rise and the change width CW2 (or a change amount, a change ratio) of the first driving current Id1 may be maintained at a suitable value (e.g., a predetermined value or less).

The waveform of the first low voltage VSS1 may be the same as the waveform of the first voltage VDD1 of FIG. 6 but is correspondingly inverted up and down.

The waveform of the second low voltage VSS2 provided to the second power line PL2 may be substantially the same as the waveform of the first low voltage VSS1 and may be delayed by an interval between the first time point t1 and the fourth time point t4.

The second low voltage VSS2 may change from the second low voltage level VL2 to the first low voltage level VL1 at the fourth time point t4, may change to the second low voltage level VL2 at the eighth time point t8, and may change to the first low voltage level VL1 at the sixth time point t6.

Similarly, the waveform of the p-th low voltage VSSp provided to the p-th power line PLp may be substantially the same as the waveform of the first low voltage VSS1, and may be delayed by an interval between the first time point t1 and the fifth time point t5.

The p-th low voltage VSSp may change from the second low voltage level VL2 to the first low voltage level VL1 at the fifth time point t5, may change to the second low voltage level VL2 at the ninth time point t9, and may change to the first low voltage level VL1 at the seventh time point t7.

As described with reference to FIGS. 10 and 11, the power supply 160 may vary (e.g., sequentially vary) the second power source voltage VSS instead of the first power source voltage VDD, thereby reducing the change width (or the change ratio) of driving currents of the pixels PXL1 to PXLp included in the display areas DA1 to DAp within the reference width and preventing the brightness change from being seen by the user.

Figure 12:
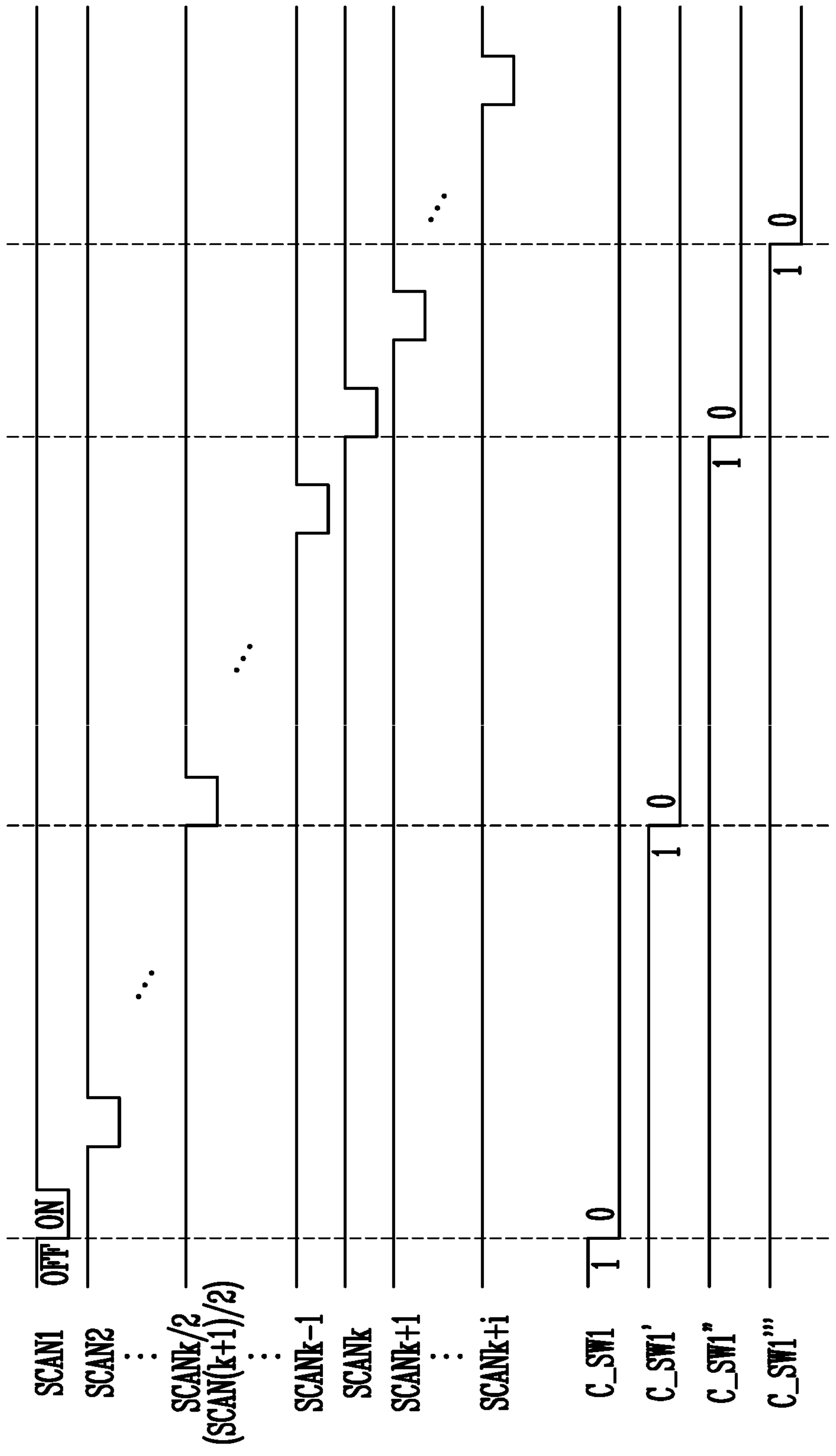
FIG. 12 is a waveform diagram illustrating an example embodiment of a switch control signal provided from the power supply of FIG. 5.

FIG. 12 is a waveform diagram illustrating an example of a switch control signal provided from a power supply of FIG. 5. FIG. 12 shows examples of a scan signal and a first switch control signal (i.e., a signal for controlling the first switch SW1 that selectively connects the first power line PL1 and the first and second power generators 511 and 512 of the first display area DA1) provided in the first display area DA1.

Referring to FIGS. 1, 5 and 12, first to k-th scan signals SCAN1 to SCANk may be provided to the first display area DA1 (e.g., may be provided to the first display area DA1 sequentially).

The first scan signal SCAN1 may be provided to the first scan line SL1 of the first display area DA1, the second scan signal SCAN2 may be provided to the second scan line SL2, and the k-th scan signal SCANk may be provided to the k-th scan line SLk.

The first to k-th scan signals SCAN1 to SCANk may include a pulse at the gate-on voltage level ON.

In exemplary embodiments, the first switch control signal C_SW1 may be varied in response to one of the first to k-th scan signals SCAN1 to SCANk.

In an exemplary embodiment, the first switch control signal C_SW1 may be varied in response to the first scan signal SCAN1. For example, the first switch control signal C_SW1 may be varied from a value of 1 to a value of 0 at the time point at which the first scan signal SCAN1 of the gate-on voltage level ON is provided on the first scan line SL1. Here, the value of 0 may be a signal for selecting the first power generator 511 shown in FIG. 5 (e. g., a signal for turning on a switch or a transistor connected between the first power line PL1 and the first power generator 511), and the value of 1 may be a signal for selecting the second power generator 512 shown in FIG. 5.

For example, the power source voltage provided to the first power line PL1 may vary at the time point at which the scan signal is applied to the first scan line (or a first arranged scan line, a scan line adjacent thereto) of the first to k-th scan lines SL1 to SLk included in the first display area DA1.

In an exemplary embodiment, the first switch control signal C_SW1' may be varied in response to a k/2-th scan signal SCANk/2 (or a (k+1)/2-th scan signal SCAN(k+1)/2, when k is an odd number). For example, the first switch control signal C_SW1' may be varied from a value of 1 to a value of 0 at the time point at which the k/2-th scan signal SCANk/2 of the gate-on voltage level ON is provided to the k/2-th scan line SLk/2.

For example, the power source voltage provided to the first power line PL1 may be varied at the time point at which a scan signal is applied to a middle scan line (or a scan line adjacent thereto) of the first to k-th scan lines SL1 to SLk included in the first display area DA1.

In an exemplary embodiment, the first switch control signal C_SW1" may be varied in response to the k-th scan signal SCANk. For example, the first switch control signal C_SW1" may be changed from a value of 1 to a value of 0 at the time point at which the k-th scan signal SCANk of the gate-on voltage level ON is provided to the k-th scan line SLk.

For example, the power source voltage provided to the first power line PL1 may be varied at the time point at which the scan signal is applied to the last scan line (or a scan line adjacent thereto) of the first to k-th scan lines SL1 to SLk included in the first display area DA1.

In an exemplary embodiment, the first switch control signal C_SW1 is described as being varied in response to one of the first to k-th scan signals SCAN1 to SCANk, but is not limited thereto.

For example, the first switch control signal C_SW1'" may be varied in response to a k+1-th scan signal SCANk+1, a k+i-th scan signal SCANk+I, and the like provided in the second display area DA2 adjacent to the first display area DA1, and may be varied at the fourth time point t4 described with reference to FIG. 6.

When the power source voltage for the first display area DA1 is varied in response to the time point at which the scan signal is provided to record data signals and emit light at the first pixel PXL1 (or first pixels) in the first display area DA1, the width and deviation of the brightness change of the first pixel PXL1 (or the first display area DA1) may be reduced or minimized. However, when the power source voltage for the first display area DA1 is varied in response to the time point at which the scan signal is provided to the second display area DA2 adjacent to the first display area DA1, the width of the brightness change may be reduced to some extent, and the degradation of the display quality due to the brightness change may not be seen by the user.

The technical idea of the present invention has been specifically described with respect to the preferred embodiments, but it should be noted that the foregoing embodiments are provided only for illustration while not limiting the present invention. In addition, it will be understood by those skilled in the art that various changes in form and details may be made therein without departing from the scope of the present invention.

The technical scope of the present disclosure may be determined by on the technical scope of the accompanying claims and their equivalents. In addition, all changes or modifications that come within the meaning and range of the claims and their equivalents will be interpreted as including the range of the present invention.

What is claimed is:

1. A display device comprising:

a display unit comprising a first display area where a first scan line, a first power line, and first pixels connected to the first scan line and the first power line are contiguously located, and a second display area where a second scan line, a second power line, and second pixels connected to the second scan line and the second power line are contiguously located;

a scan driver configured to sequentially provide a scan signal to the first scan line and the second scan line; and a power supply configured to provide a power source voltage to the first power line and the second power line and configured to vary the power source voltage between a first voltage level and a second voltage level independently in the first power line and the second power line in accordance with a frame period, the first voltage level and the second voltage level being set so that a driving current flows in the first pixels when the power source voltage having the first voltage level is applied to the first power line and when the power source voltage having the second voltage level is applied to the first power line, wherein the first and second voltage levels of the power source voltage are higher than a voltage level of a voltage applied to the second power line.

2. The display device of claim 1, wherein the first voltage level and the second voltage level are set so that the driving current flows in the second pixels, the second voltage level is higher than the first voltage level, a voltage level of the power source voltage provided to the first power line at a first time point changes from the second voltage level to the first voltage level, and a voltage level of the power source voltage provided to the second power line at a second time point different from the first time point changes from the second voltage level to the first voltage level.

3. The display device of claim 2, wherein the scan signal of a gate-on voltage level is provided to the first scan line at a third time point, the scan signal of a gate-on voltage level is provided to the second scan line at a fourth time point different from the third time point, an interval between the first time point and the third time point is equal to an interval between the second time point and the fourth time point, and the gate-on voltage level is a voltage level to turn on transistors included in each of the first and second pixels.

4. The display device of claim 3, wherein the first time point is equal to the third time point, and the second time point is equal to the fourth time point.

5. The display device of claim 4, wherein k scan lines are arranged sequentially in the first display area, and the first scan line is a first arranged scan line of the k scan lines or adjacent to the first arranged scan line of the k scan lines.

6. The display device of claim 4, wherein k scan lines are arranged sequentially in the first display area, and the first scan line is a k-th arranged scan line of the k scan lines or adjacent to the k-th arranged scan line of the k scan lines.

7. The display device of claim 4, wherein k scan lines are arranged sequentially in the first display area, and the first scan line is adjacent to a k/2-th arranged scan line of the k scan lines.

8. The display device of claim 3, wherein the first time point is equal to the fourth time point.

9. The display device of claim 1, wherein the power supply is configured to operate in a first mode or in a second mode, is configured to change the power source voltage in the second mode, and is configured to maintain the power source voltage constant in the first mode.

10. The display device of claim 9, wherein a driving frequency of the scan driver while the power supply is driven in the first mode is greater than a driving frequency of the scan driver while the power supply is driven in the second mode.

11. The display device of claim 10, wherein a change amount or a change rate of a driving current flowing in each of the first pixels during one frame period is maintained constant in a first period corresponding to the first mode and in a second period corresponding to the second mode.

12. The display device of claim 1, wherein the power supply comprises:

a first power generator to generate a first power source voltage having the first voltage level;

a second power generator to generate a second power source voltage having the second voltage level; and a first switching unit to connect the first power line to one of the first power generator and the second power generator.

13. The display device of claim 12, wherein the power supply further comprises:

a third power generator to generate a third power source voltage having a third voltage level, and the first switching unit to connect the first power line to one of the first power generator, the second power generator, and the third power generator.

14. The display device of claim 1, wherein the display unit comprises ten or more display areas, and at least some of the display areas have the same size as each other.

15. The display device of claim 14, wherein the display areas correspond to pixel rows, respectively.

16. The display device of claim 1, wherein each of the first and second pixels comprises a light emitting element connected to the first power line and a third power line, and an anode of the light emitting element is connected to the first power line and a cathode of the light emitting element is connected to the third power line.

17. The display device of claim 1, wherein each of the first pixels comprises a light emitting element connected to the first power line and a third power line, and an anode of the light emitting element is connected to the third power line and a cathode of the light emitting element is connected to the first power line.

18. The display device of claim 1, wherein the first pixels and the second pixels are configured to sequentially emit light in response to the scan signal.

19. The display device of claim 1, further comprising a data driver configured to provide a data signal to a data line, wherein the data line is included in the display unit, and extends across the first display area and the second display area, and wherein at least one of the first pixels and at least one of the second pixels are connected to the data line.

20. A display device comprising:

a display unit comprising a first display area where a first scan line, a first power line, and first pixels connected to the first scan line and the first power line are located, and a second display area where a second scan line, a second power line, and second pixels connected to the second scan line and the second power line are located;

a scan driver configured to sequentially provide a scan signal to the first scan line and the second scan line; and a power supply configured to provide a power source voltage that is varied independently to the first power line and the second power line, wherein the power supply comprises:

a first power generator to generate a first power source voltage having a first voltage level;

a second power generator to generate a second power source voltage having a second voltage level; and a first switching unit to connect the first power line to one of the first power generator and the second power generator, wherein the power supply further comprises:

a third power generator to generate a third power source voltage having a third voltage level, and the first switching unit to connect the first power line to one of the first power generator, the second power generator, and the third power generator, and wherein when a target brightness of the first pixels is greater than a reference brightness, the first switching unit is configured to alternately connect the first power generator and the second power generator to the first power line, and when the target brightness of the first pixels is less than or equal to the reference brightness, the first switching unit is configured to alternately connect the first power generator and the third power generator to the first power line.

* * * * *